US007549924B2

(12) United States Patent
Canessa et al.

(10) Patent No.: US 7,549,924 B2
(45) Date of Patent: Jun. 23, 2009

(54) INSTANT MESSAGING EMBEDDED GAMES

(75) Inventors: Gregory J. Canessa, Seattle, WA (US); Jonathan T. David, Seattle, WA (US); Kristofer N. Iverson, Issaquah, WA (US); Donald R. Ryan, Redmond, WA (US); Bryan G. Trussel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1072 days.

(21) Appl. No.: 10/435,290

(22) Filed: May 9, 2003

(65) Prior Publication Data

US 2004/0224772 A1 Nov. 11, 2004

(51) Int. Cl.
*A63F 13/00* (2006.01)
(52) U.S. Cl. ................................ 463/42; 463/40; 463/9
(58) Field of Classification Search ........................ None
See application file for complete search history.

(56) References Cited

U.S. PATENT DOCUMENTS

| | | | | |
|---|---|---|---|---|
| 5,935,002 | A * | 8/1999 | Falciglia | 463/19 |
| 6,322,451 | B1 * | 11/2001 | Miura | 463/42 |
| 6,496,851 | B1 * | 12/2002 | Morris et al. | 709/204 |
| 6,539,421 | B1 * | 3/2003 | Appelman et al. | 709/206 |
| 6,677,968 | B1 * | 1/2004 | Appelman | 715/853 |
| 6,755,743 | B1 * | 6/2004 | Yamashita et al. | 463/42 |
| 6,807,562 | B1 * | 10/2004 | Pennock et al. | 709/204 |
| 6,981,223 | B2 * | 12/2005 | Becker et al. | 715/753 |
| 7,240,093 | B1 * | 7/2007 | Danieli et al. | 709/205 |
| 2001/0044339 | A1 * | 11/2001 | Cordero et al. | 463/42 |
| 2002/0026355 | A1 * | 2/2002 | Mitsuoka et al. | 705/14 |
| 2002/0037767 | A1 * | 3/2002 | Ebin | 463/25 |
| 2002/0072412 | A1 * | 6/2002 | Young et al. | 463/42 |
| 2002/0086732 | A1 * | 7/2002 | Kirmse et al. | 463/42 |
| 2002/0183117 | A1 * | 12/2002 | Takahashi et al. | 463/42 |
| 2003/0009549 | A1 * | 1/2003 | Maehiro | 709/223 |
| 2003/0228908 | A1 * | 12/2003 | Caiafa et al. | 463/42 |
| 2004/0097287 | A1 * | 5/2004 | Postrel | 463/41 |
| 2004/0162144 | A1 * | 8/2004 | Loose et al. | 463/42 |
| 2004/0192440 | A1 * | 9/2004 | Evans et al. | 463/30 |

FOREIGN PATENT DOCUMENTS

| | | |
|---|---|---|
| EP | 1091582 | 4/2001 |
| EP | 1258273 | 11/2002 |
| WO | WO 00/29084 | 5/2000 |

OTHER PUBLICATIONS

J.H. Lee, A. Prakash, T. Jaeger and G. Wu, "Supporting Multi-User, Multi-Applet Workspaces in CBE," *Computer Supported Cooperative Work '96*, pp. 344-353 (1996).
European Search Report dated Sep. 23, 2004 for European Patent Application No. EP 04008231.

\* cited by examiner

*Primary Examiner*—Ronald Laneau
*Assistant Examiner*—Tramar Harper
(74) *Attorney, Agent, or Firm*—Workman Nydegger

(57) ABSTRACT

Instant messaging systems and methods are disclosed. The systems and methods allow users to play competitive and collaborative games using an instant messaging client application. The client application may create a user interface screen that includes an instant messaging region or window for exchanging instant messages and a game region or window for playing games.

21 Claims, 11 Drawing Sheets

INSTANT MESSAGING EMBEDDED GAMES

FIELD OF THE INVENTION

Aspects of the present invention relate to instant messaging applications. More specifically, aspects of the present invention relate to instant messaging applications that allow users to play collaborative and competitive games.

BACKGROUND

Online game playing has become increasingly popular. Users at remote locations connect to the Internet and play competitive and collaborative games hosted at a website. Typically, when a user desires to play games, they must first decide on the game they want to play, then the user must go through the process of locating a website that provides the game and then searching for additional users to play the game. If the user wishes to change games, the user often must search for another website and users wishing to play the new game.

There are several limitations associated with conventional online game playing systems. First, users often must perform a search of websites to find a website that hosts a desired game. Users are often then forced to go through the process of registering and logging on to each website separately. Frequently users do not know a large percentage of the other users playing games on game websites. The lack of familiarity with other users can degrade the online game playing experience. For example, it can be difficult to match skill levels, and users may not like the manner in which other users play online games.

Therefore, there is a need in the art for online game playing systems and methods that allow users to connect to a computer network to conveniently play collaborative and competitive games with other known users.

BRIEF SUMMARY

Aspects of the present invention address one or more of the issues mentioned above, thereby providing a better online game playing experience. Instant messaging systems are configured to provide access to competitive and collaborative games. Games may be played in the same user interface used to exchange instant messages. An instant messaging system user may select participants from the user's buddy list. Among other advantages, providing access to games through an instant messaging system allows users to select games after reviewing buddy lists to see who is available to play games instead of first selecting a game and then searching for participants. Instant messaging systems also provide a convenient way to advertise premium games and distribute premium games.

BRIEF DESCRIPTION OF THE DRAWINGS

Aspects of the present invention are described with respect to the accompanying figures, in which like reference numerals identify like elements, and in which.

DETAILED DESCRIPTION

Exemplary Operating Environment

Aspects of the present invention may be implemented with a distributed computer system operating environment that provides an instant messaging capability. In a distributed computing environment, tasks may be performed by remote computer devices that are linked through communications networks. The distributed computing environment may include client and server devices that may communicate either locally or via one or more computer networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, mini-computers, mainframe computers, and the like.

The invention will be described in the general context of computer-executable instructions, such as program modules, that are executed by a processing device, including, but not limited to a personal computer. Generally, program modules include routines, programs, objects, components, data structure definitions and instances, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available media that can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
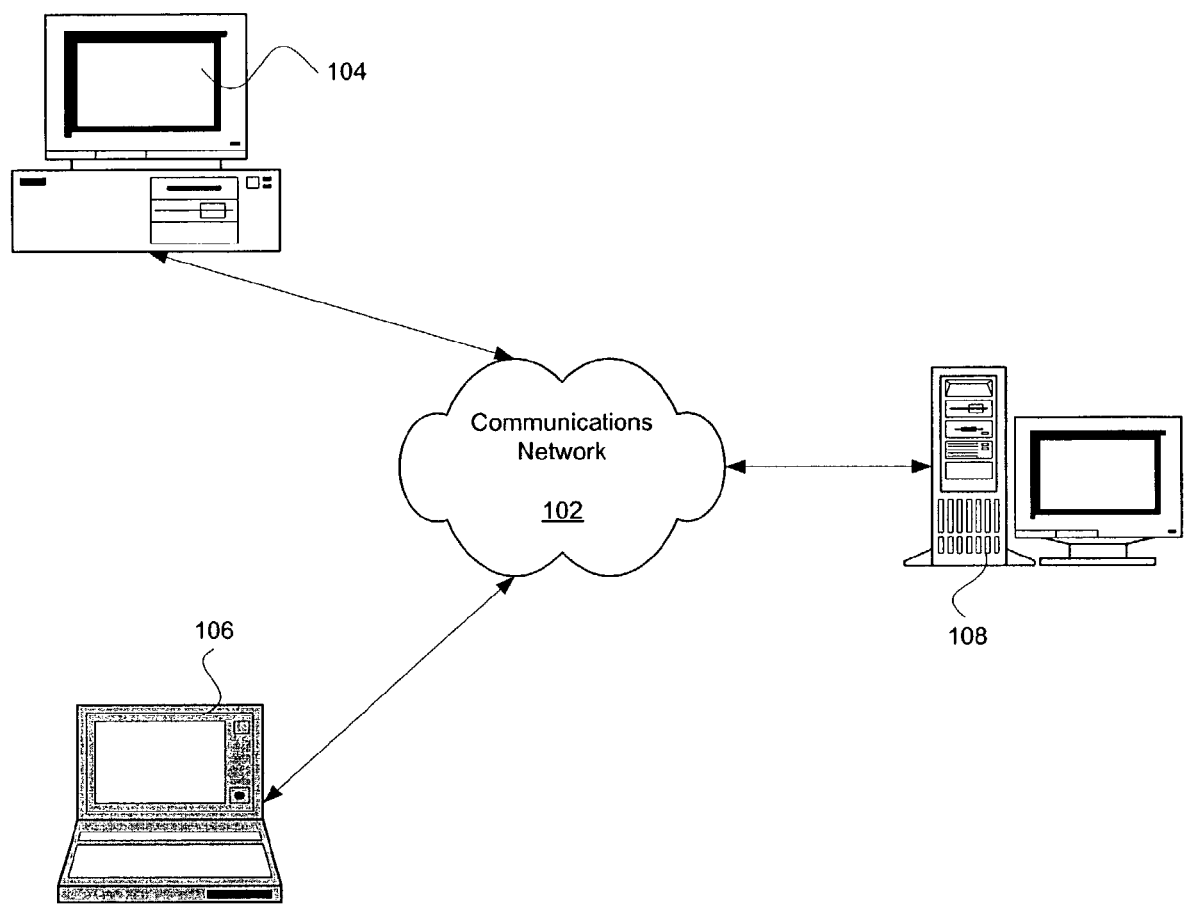
FIG. 1 shows an illustrative distributed computing system operating environment that may be used to implement aspects of the invention.

FIG. 1 illustrates an example of a suitable distributed computing system 100 operating environment in which the invention may be implemented. Distributed computing system 100 is only one example of a suitable operating environment and is not intended to suggest any limitation as to the scope of use or functionality of the invention. System 100 is shown as including a communications network 102. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services such as the Microsoft Network or America Online's Network. Systems may also include more than one communication network, such as a LAN coupled to the Internet.

Computer device 104, computer device 106 and computer device 108 may be coupled to communications network 102 through communication devices. Network interfaces or adapters may be used to connect computer devices 104, 106 and 108 to a LAN. When communications network 102 includes a WAN, modems or other means for establishing communications over WANs may be utilized. Computer devices 104, 106 and 108 may communicate with one another via communication network 102 in ways that are well known in the art. The existence of any of various well-known protocols, such as TCP/IP, Ethernet, FTP, HTTP and the like, is presumed. Computer devices 104, 106 and 108 may exchange content, applications, messages and other objects via communications network 102.

The configuration and operation of instant messaging systems are well known in the art. Exemplary instant messaging systems include MSN Messenger, AOL® Instant Messenger™ and Yahoo Messenger. Instant messages may be sent between computers connected to local area network using a peer-to-peer configuration or between computers connected to a wide area network, such as the Internet, using a client-server configuration. With a client-server configuration, when a user connects to the network, a client application connects to an instant messaging server. After the user connects to the server, the server updates the user's status to show that the user is online. Information describing the user's change in status may be sent to other users identified by the user in a buddy list.

Figure 2:
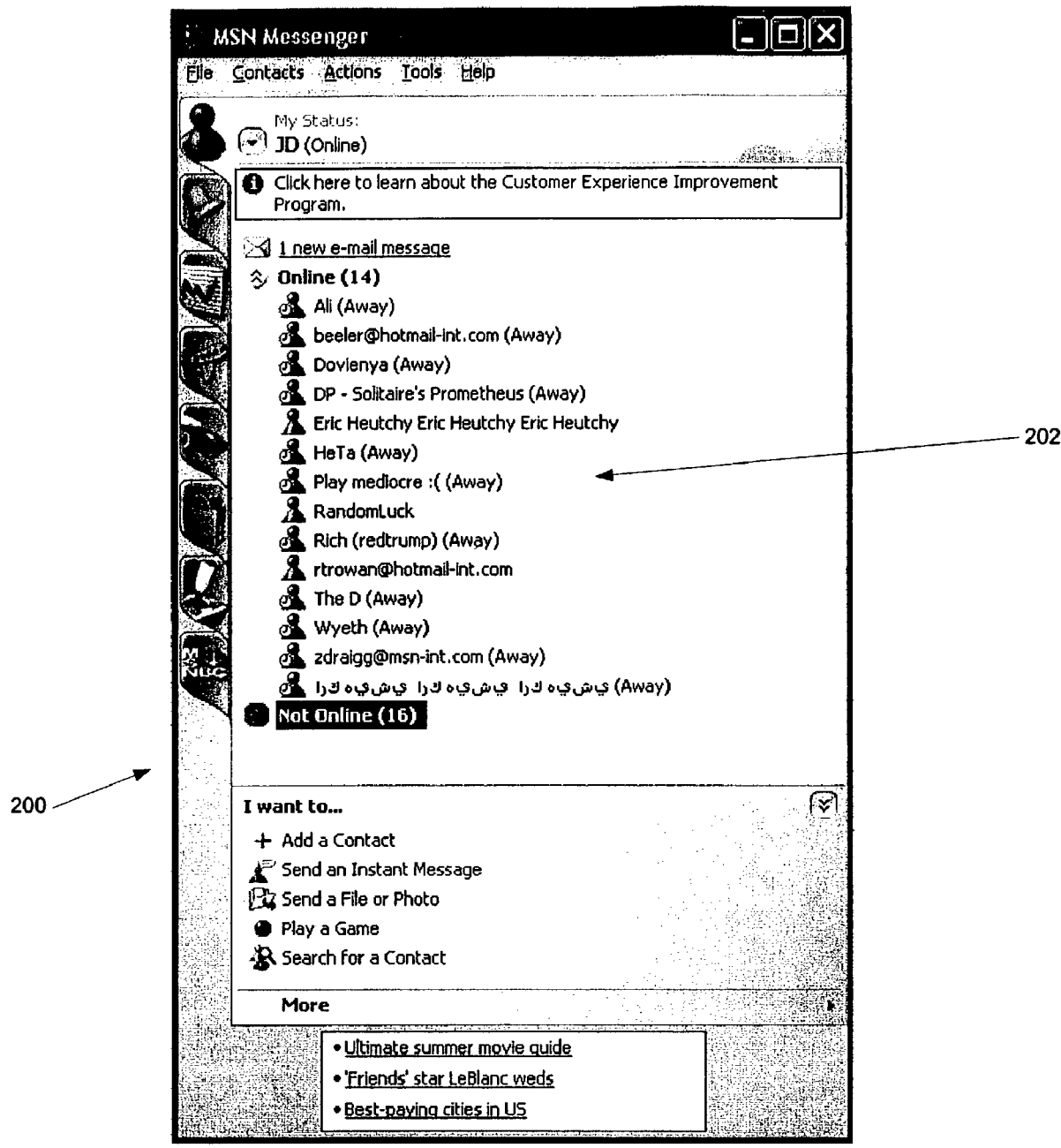
FIG. 2 shows an instant messaging buddy list user interface.
Figure 3:
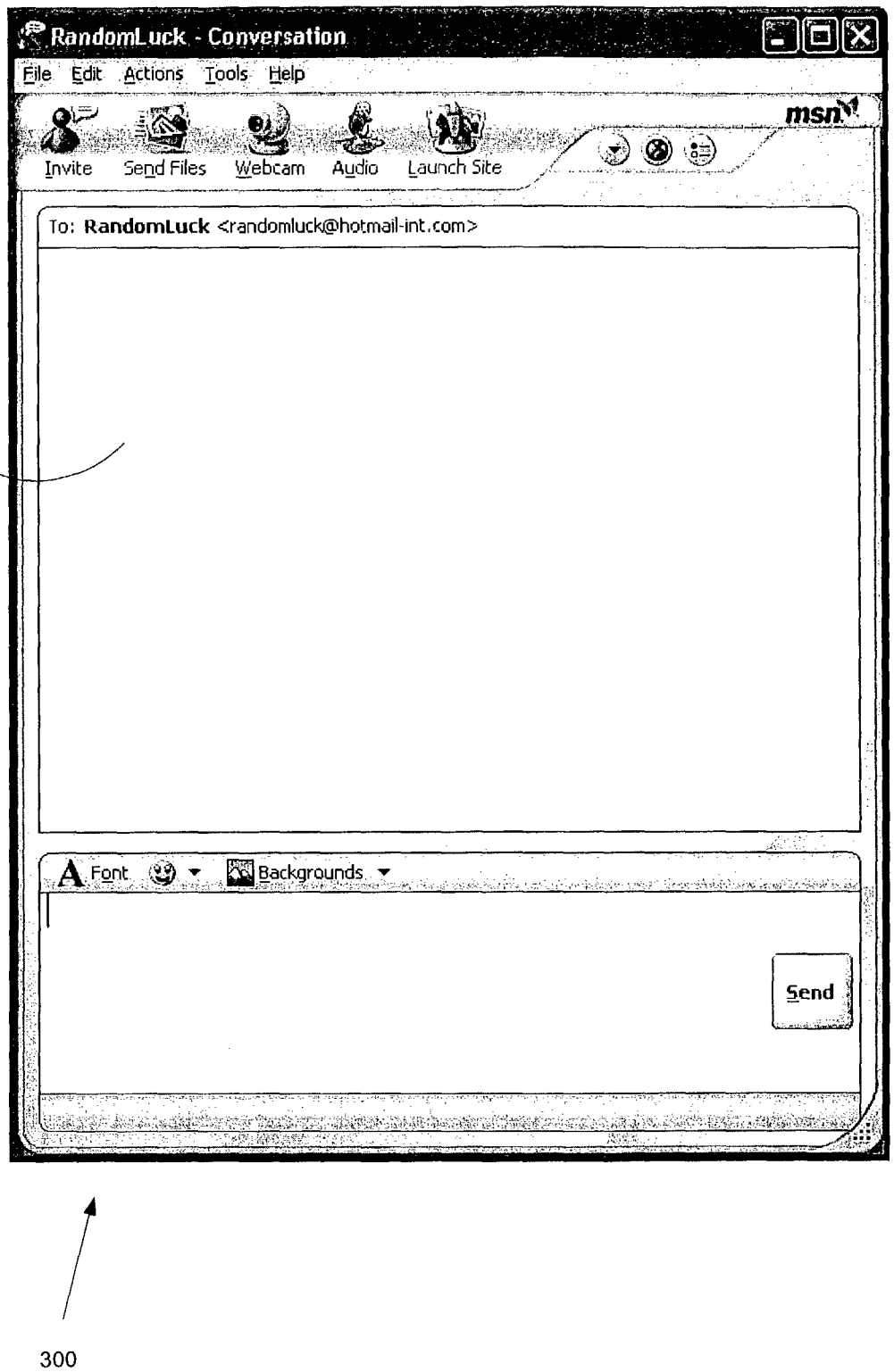
FIG. 3 illustrates a typical user interface that allows users to exchange instant messages.

FIG. 2 shows an instant messaging user interface 200. A buddy list region 202 shows users identified by the user as buddies. The buddies are grouped according to whether they are online or not online. The user can send an instant message to a buddy identified as being online by selecting the buddy, which will open a new instant messaging region. For example, selecting a buddy may cause user interface 300, shown in FIG. 3, to appear on the user's display. User interface 300 includes an instant messaging region 302 that allows the user and the buddy to exchange instant messages. User interface 300 also allows the user to perform such tasks as exchanging text messages, files and photos.

Description of Illustrative Embodiments

Figure 4:
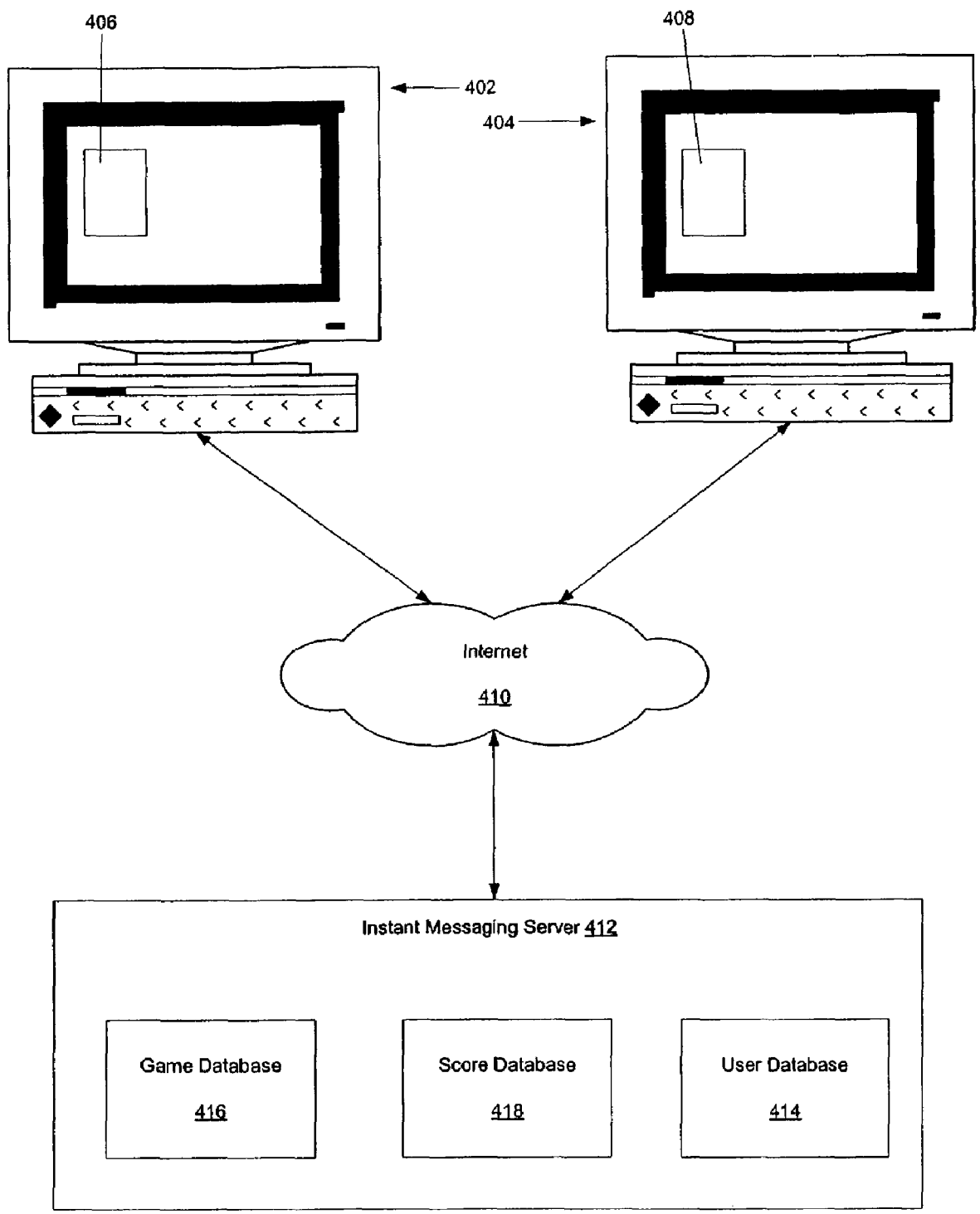
FIG. 4 illustrates an instant messaging system configured to allow users to play single and multiplayer games; in accordance with an embodiment of the invention.

FIG. 4 illustrates an instant messaging system configured to allow users to play single and multiplayer games in accordance with an embodiment of the invention. Terminals 402 and 404 are each configured to run an instant messaging client application, such as MSN Messenger, AOL® Instant Messenger™ or Yahoo Messenger. Terminals 402 and 404 may be implemented with computer workstations, personal digital assistants (PDAs), mobile telephones or any other devices capable of exchanging instant messages. Terminals 402 and 404 display user interfaces 406 and 408 respectively. User interfaces 406 and 408 maybe used to perform such functions as exchanging instant messages and playing games as described in detail below. There may be multiple other terminals in addition to 402 and 404

Terminals 402 and 404 are shown coupled to the Internet 410. Of course, aspects of the invention may work with other networks. In one embodiment of the invention, the terminals are connected to a local area network and exchange data using a peer-to-peer protocol. An instant messaging server 412 is also shown coupled to the Internet 410. Instant messaging server 412 may include a user database 414 for performing conventional functions such as keeping track of when users are online and storing buddy lists. A games database 416 may be included to store game modules that will be sent to terminals 402 and 404. Games may be competitive, collaborative or a combination of competitive and collaborative. Moreover, a single user may participate in two or more game sessions simultaneously. One exemplary collaborative game is a crossword puzzle. One exemplary competitive game is checkers. Game database 416 may also include games that were originally designed for solo or single player play, that may be enabled via aspects of the invention to be played by two or more users in a competitive or collaborative fashion. For example, utilizing the invention, a user may be able to play a game of Solitaire, originally a single player game experience, competitively with another player utilizing a common deck of cards and competing for high score, or cooperatively, attempting to complete the game as a team. When two or more users are playing a single player game competitively, competing scores may be provided to the users in real time. Also, results from one player's actions may affect the score or play of the other person. Certain games may be configured so that game play influences instant messaging sessions and vice versa. For example, while playing a word game, certain words used in the instant messaging session may appear in the game. A score database 418 may be included to store game statistics, such as high scores, handicaps, rankings, etc. In one embodiment, score database 418 may be used to store game state information when a user pauses a game. State information may be stored when the users intend to both resume play later or after the last user connected to instant messaging server 412 disconnects. For example, users may play a game of chess and login to instant messaging server 412 at different times to make moves. State information may be stored after a user moves and disconnects from instant messaging server 412.

Instant messaging server 412 may include additional components for performing conventional instant messaging functions. Moreover, the functions of databases 414, 416, 418 may be combined and performed by a single database or performed by other databases. A match making module (not shown) may be included to, for example, match a first instant messaging user with another user not on the first user's buddy list. The match making may be a function of user profiles or other information. In one alternative embodiment, an instant messaging server does not include databases and other modules for performing game functions. An instant messaging client application may be configured to coordinate the aggregation of data with both an instant message server and a separate game server. One skilled in the art will appreciate that numerous servers may be included to perform different instant messaging and game functions. The servers may be configured to aggregate data between each other and/or an instant messaging client application may be configured to aggregate data from some or all of the servers.

Figure 5:
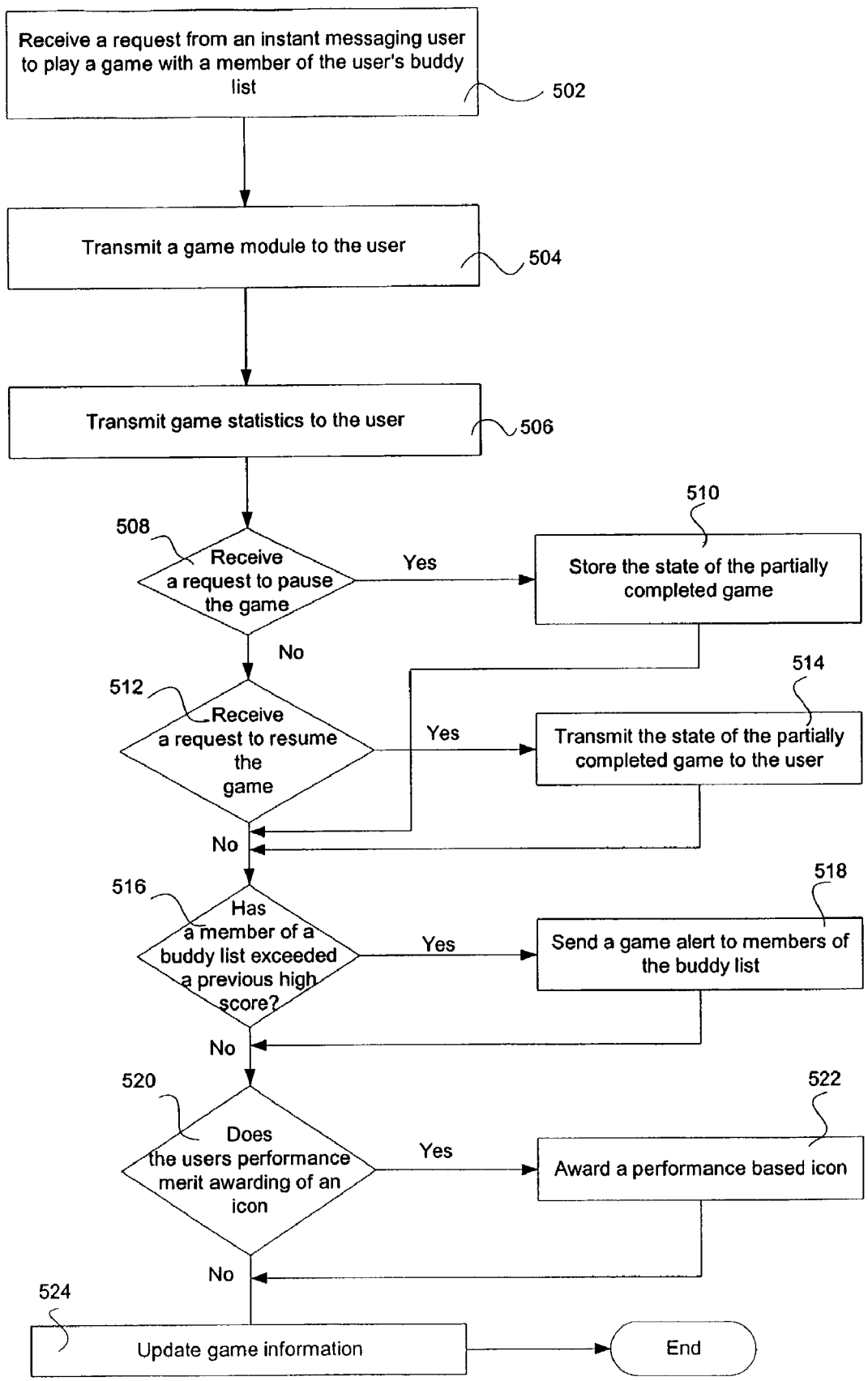
FIG. 5 illustrates a flow chart including some of the functions that may be performed by an instant messaging server, in accordance with an embodiment of the invention.

In accordance with embodiments of the invention, an instant messaging server may be configured to perform several instant messaging and game functions. As used in this application, an instant messaging server is meant to encompass a group of servers configured to work together, such as a server farm. FIG. 5 illustrates a flow chart including some of the functions that may be performed by an instant messaging gaming experience server, in accordance with an embodiment of the invention. Of course, an implementation may include additional steps or steps arranged in different orders. First, in step 502 an instant messaging server receives a request from a user to play a game with a member of the user's buddy list. The user may provide a request by highlighting an entry in the user's buddy list and then making a selection from a menu. For example, the user may highlight an element of the user's buddy list with a pointing device and press a right button and then select a particular game from a menu. Next, in step 504 the server transmits a game module to the instant messaging user. Of course, the game module may also be transmitted to the members of the buddy list who will participate in the game. A game module may include an entire application or enough computer executable instructions for an instant messaging client application to present the game to a user. In one embodiment in which the users are connected to a local area network, the instant messaging server transmits the game module to a first user and the first user transmits the game module to subsequent users.

Figure 6:
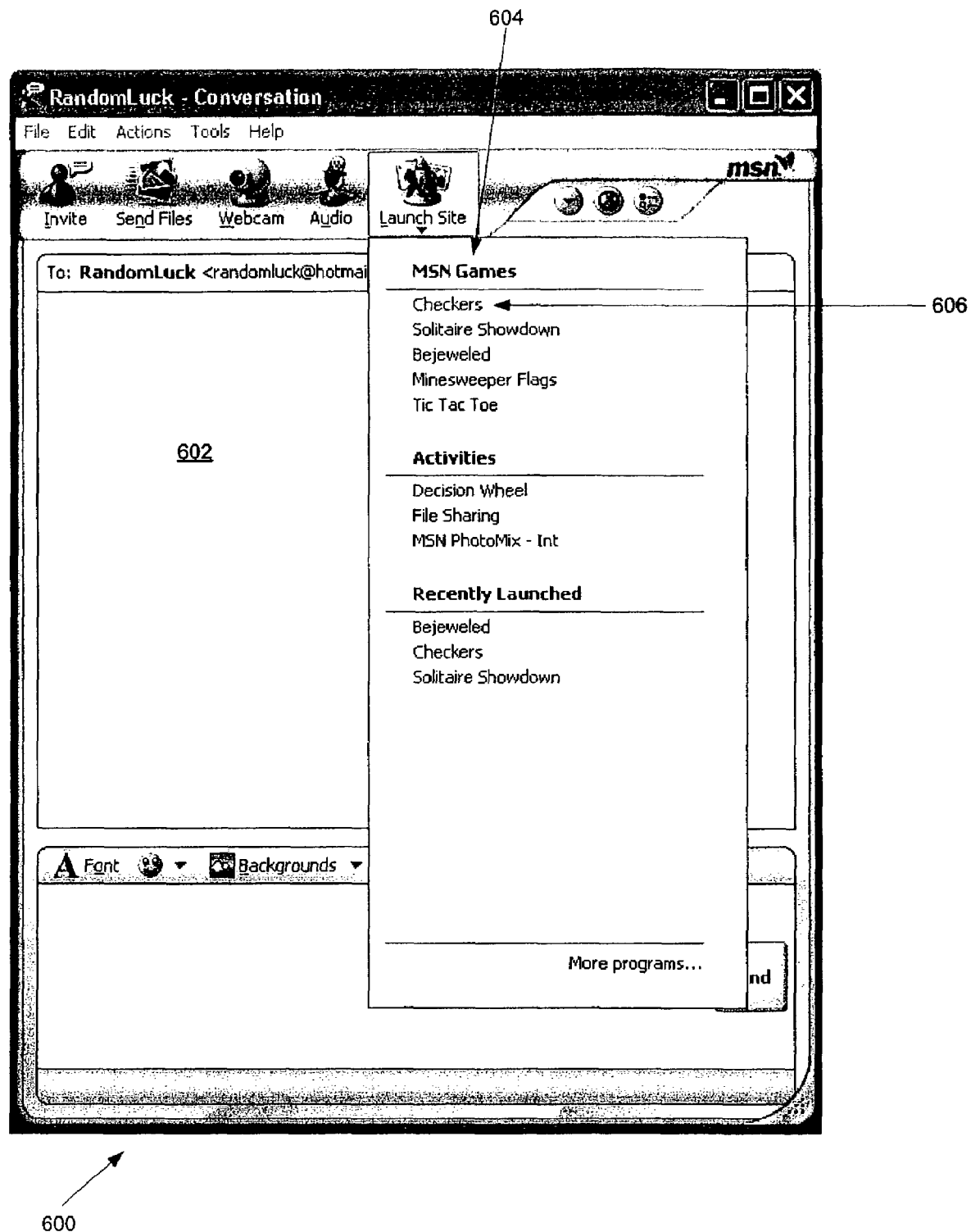
FIG. 6 illustrates an exemplary user interface that may be used to request a game to present to a user; in accordance with an embodiment of the invention.

FIG. 6 illustrates an exemplary user interface 600 that may be used to request a game to present to a user. The user may exchange instant messages in a first region 602. While exchanging instant messages, a user may select a game from a game list region 604 to play with the participants of the instant messaging session. The user may for example select a Checkers link 606 during the instant messaging session to play the game Checkers. Game list region 604 may be configured to list all available games and include a separate indication of the games that a user has rights to play. For example, the list may include all of the games accessible through an instant messaging server and include an icon next to the games that the user has rights to play.

Figure 7:
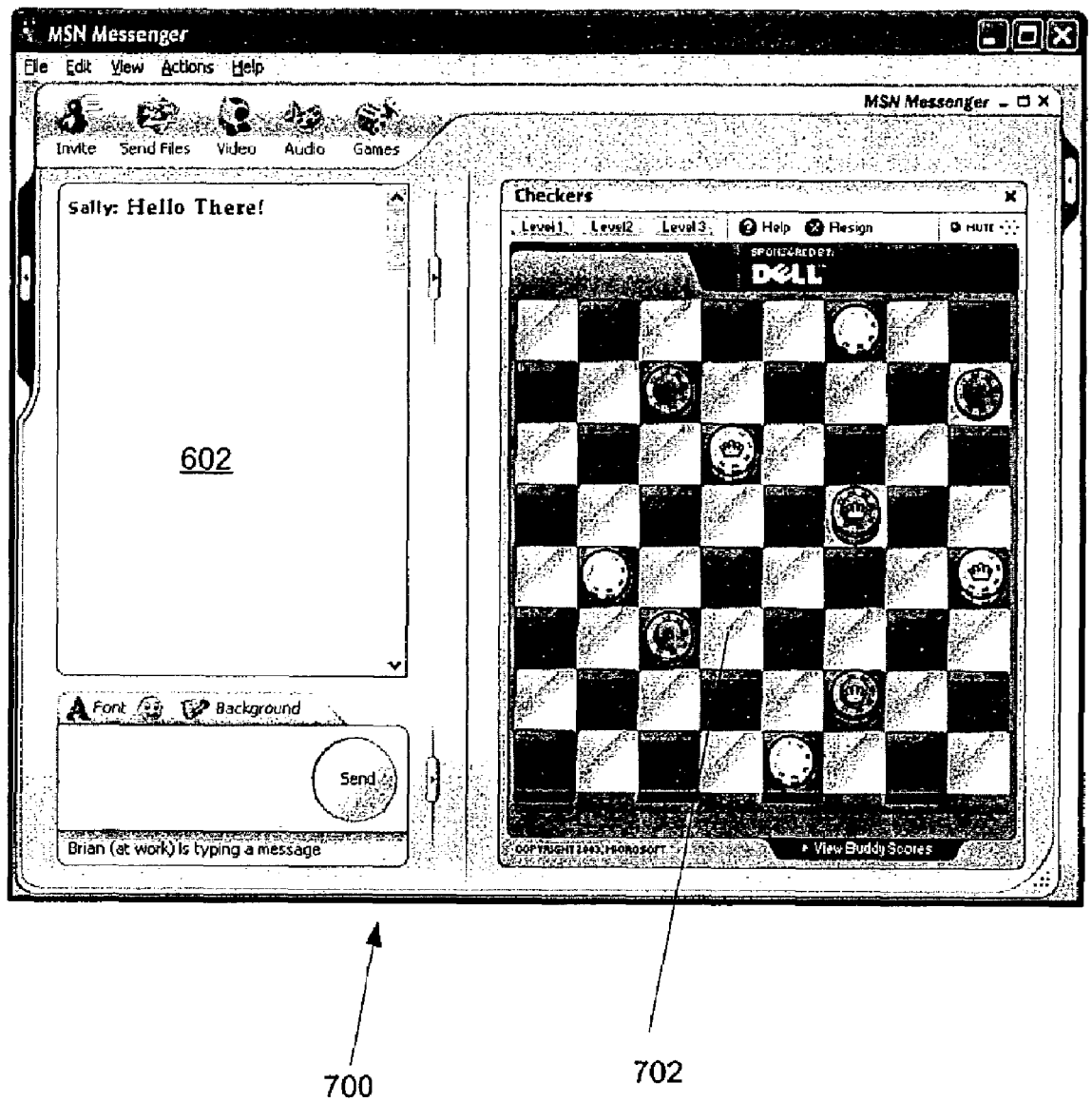
FIG. 7 illustrates a user interface that may be presented to a user in response to a user selecting a particular link; in accordance with an embodiment of the invention.

FIG. 7 illustrates a user interface 700 that may be presented to a user in response to a user selecting Checkers link 606 (shown in FIG. 6). User interface 700 includes an instant messaging region 602 and a game region 702. The necessary data for creating game region 702 may be transmitted from a server in step 504. Region 702 may be a window that is launched by, but not controlled by the Instant Messaging application. User interface 700 allows users to exchange instant messages while playing a game. In one embodiment, a user may block some members of the user's buddy list from seeing the instant messages exchanged by a subset of the members of the buddy list. For example, when a first group of members are collaborating in a game against a second group of members, the first group may prevent the second group from viewing messages exchanged between the first group of members. One or more additional instant messaging regions may be included with different restrictions, defined by the environment or the users. For example, a first instant messaging region may be accessible by all members participating in a game and a second instant messaging window may be accessible by only members on the same team. In another embodiment, users may be able to create permanent associations or "teams" of buddies with common visual iconography to identify the group. This group may share a common instant messaging chat window, share common statistics, and participate in structured tournaments and events as a team.

Figure 8:
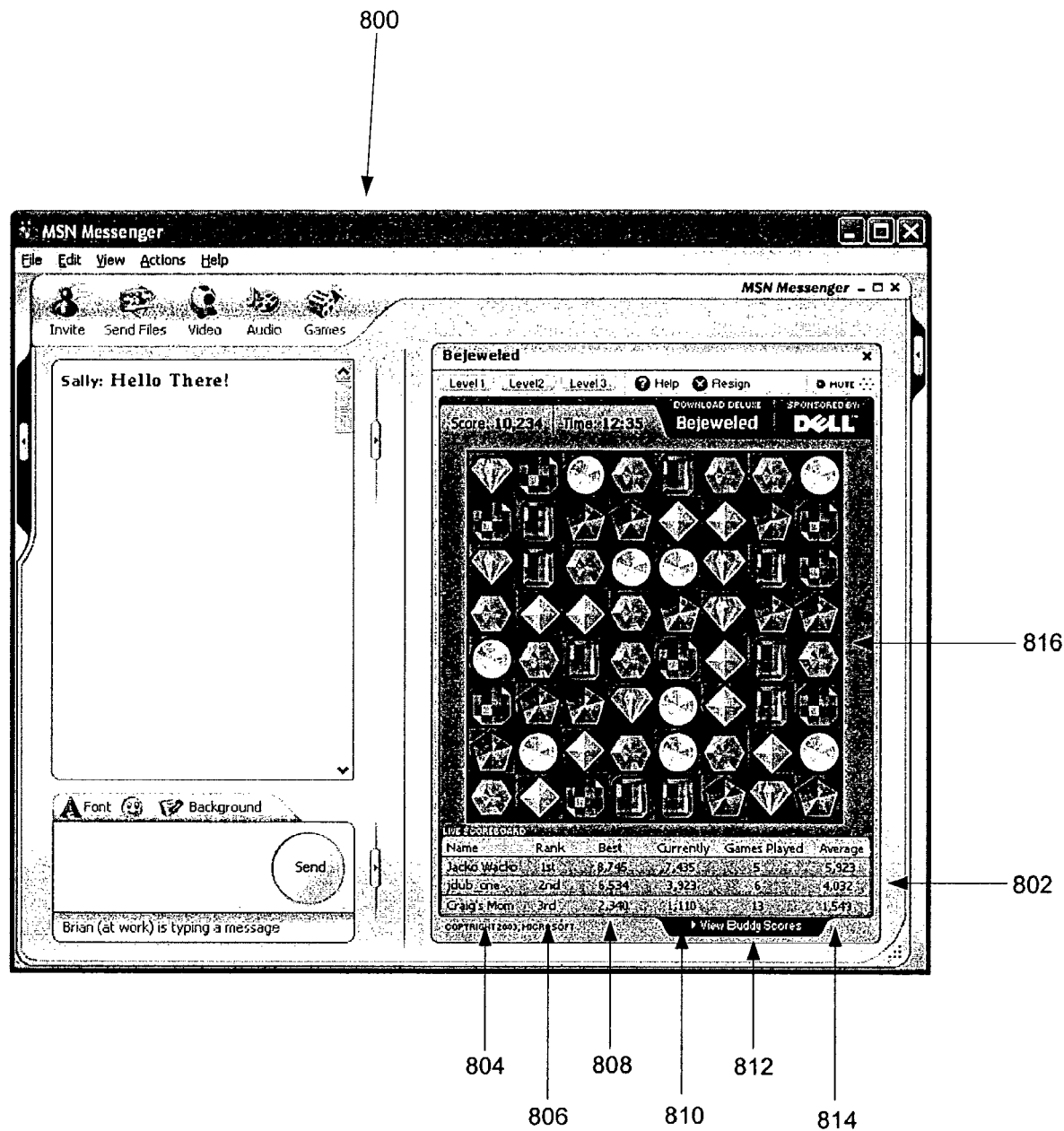
FIG. 8 illustrates an exemplary user interface that includes a plurality of statistics for a game; in accordance with an embodiment of the invention.
Figure 9:
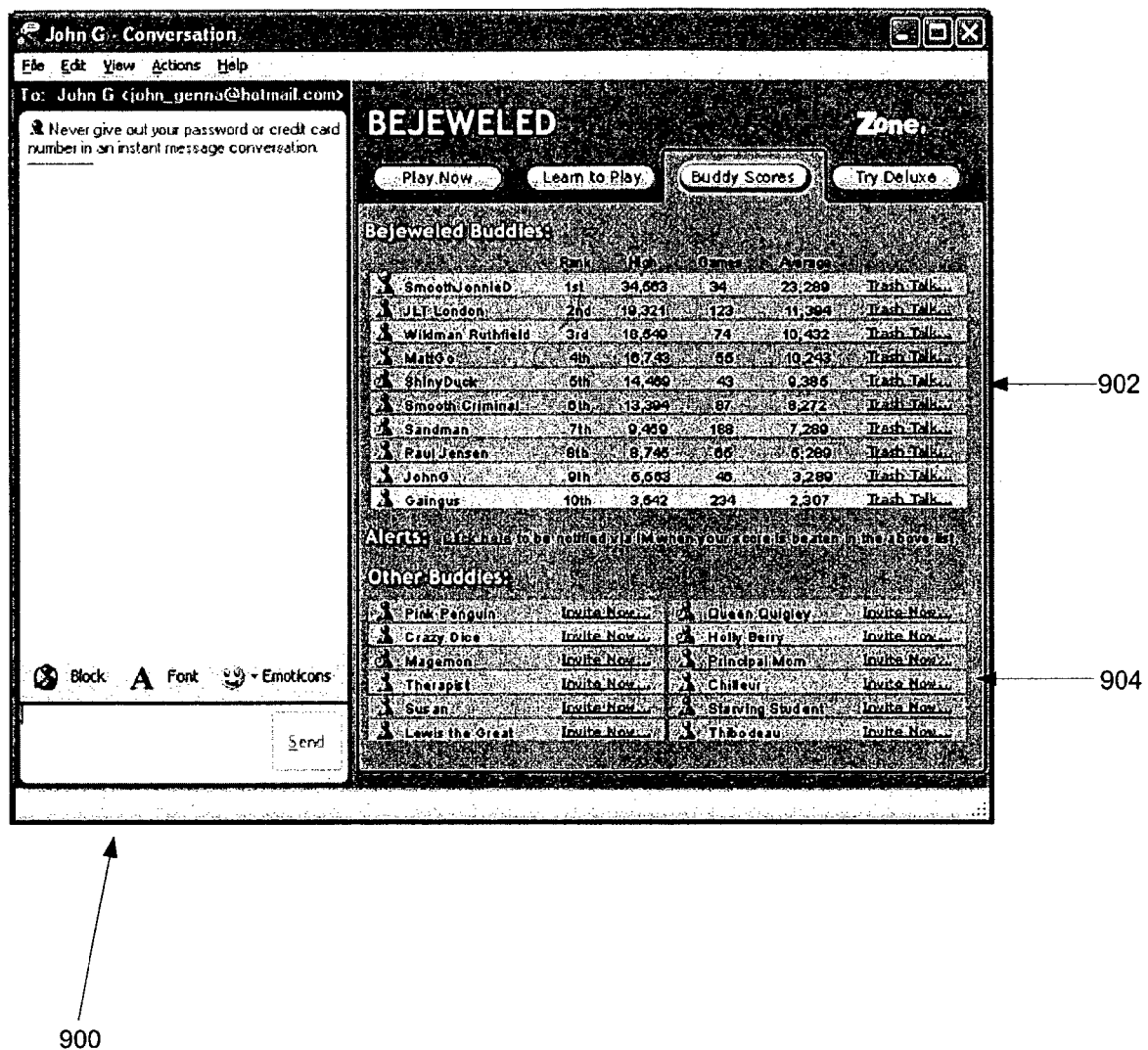
FIG. 9 illustrates an alternative user interface screen that may be used to display information such as game statistics, a list of rankings, a list of buddies who have not experienced the game yet, and/or a list of buddy participants in a game tournament or other structured event, in accordance with an embodiment of the invention.

In one embodiment of the invention, the user interface screen used to exchange instant messages and play games may also present a variety of game statistics and options to the user. The game statistics may be compiled and processed by the instant messaging server. The instant messaging server may provide services and statistics in response to requests from users. For example, in step 506, game statistics are transmitted to the user. Game statistics may include high scores, rankings, average scores, number of times played, handicap information, tournament ladder information, etc., on an individual or team basis. Game statistics may also contain user profile information. FIG. 8 illustrates an exemplary user interface 800 that includes a plurality of statistics for a game. Statistic region 802 includes a column 804 that includes an identification members of the user's buddy list who have also played the game displayed. Column 806 includes the relative rankings of members of the buddy list. Each member's best score is included in column 808. Each member's current score may be included in column 810 and the number of games played and average scores may be included in columns 812 and 814, respectively. Of course, additional statistics and information, such as game ratings provided by buddies may also be provided. FIG. 9 illustrates an alternative user interface screen 900 that may be used to display game statistics to a user. A first region 902 includes the identification of members of the user's buddy list who have played the game. A second region 904 identifies buddy list members who have not played the game yet. User interface screen 900 may be used to introduce new games to members of a buddy list or as an aid in matching contestants. For example, a user may quickly scan region 902 and identify a member with a similar skill level.

During the playing of a game, the participants may decide to pause the game and resume play at a later time. Returning to FIG. 5, in step 508 an instant messaging server may receive a request to pause a game. When the request is received, the state of the partially completing game is stored in step 510. State information may include the current scores of each participant as well as sufficient information to resume playing the game at a later time. For example, when pausing a game of chess, state information may include an identification of each location of each chess piece, who's turn it is, how much time has elapsed, etc. The state information may be stored locally at one of the terminals and/or remotely at an instant messaging server. Storing the state information remotely facilitates resuming the game at a different terminal.

In step 512 the instant messaging server determines whether a request to resume the game has been received. When a request has been received, in step 514 the state of the partially completed game is transmitted back to the user. Step 514 may include transmitting the state of the partially completed game back to a plurality of users who participated in the game. Of course, step 514 may not be needed when state information is stored locally at a terminal.

An instant messaging server may be configured to transmit a variety of different types of information to users. For example, a user may choose to receive a notice when a particular high score is exceeded. In step 516 the instant messaging server determines whether a member of a buddy list has exceeded a previous high score. When a member of a buddy list has exceeded a previous high score, in step 518 the instant messaging server may send a game alert to one or more members of the buddy list. The game alert may identify a member of the buddy list who exceeded the high score as well as the score. Members of the buddy list may choose not to receive such notices or to receive a subset of the notices that are available. Step 518 may include sending an instant message or an e-mail message.

In one embodiment of the invention, user instant messaging icons are assigned based on game performance. For example, first, second and third place trophy icons may be awarded to members of the buddy list who achieve the first, second and third highest scores for a particular game or a particular group of games. In step 520 the server determines whether the user's performance merits the awarding of an icon. The determination may be based on analyzing a plurality of scores, individual scores or any criteria provided by the members of the buddy list. When the criteria has been met, in step 522 the server may award a performance-based icon. Step 522 may also include removing a performance-based icon from another member. For example, if a special icon is used to identify a member as having the highest score, when a new high score is achieved, the high score icon is taken away from the previous high score holder and awarded to the new high score holder. A user may be awarded several icons and choose which one to use. Finally, in step 524 the server may update game information. Step 524 may include reporting scores, updating rankings, including list of buddies who have not experienced the game yet and updating any other information that has changed after a game is completed.

Figure 10:
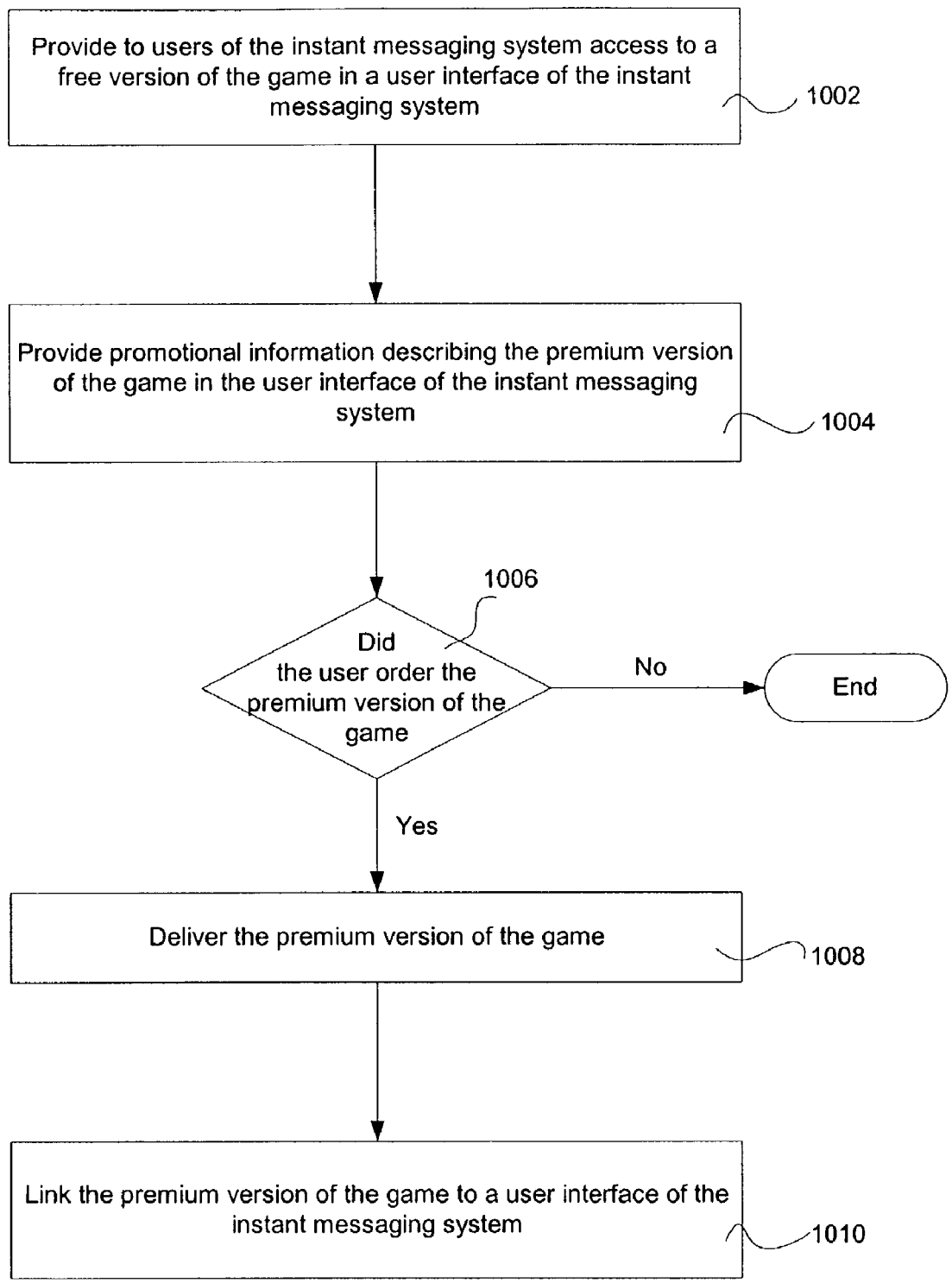
FIG. 10 illustrates a method of advertising and distributing a premium version of a game to users of an instant messaging system; in accordance with an embodiment of the invention.
Figure 11:
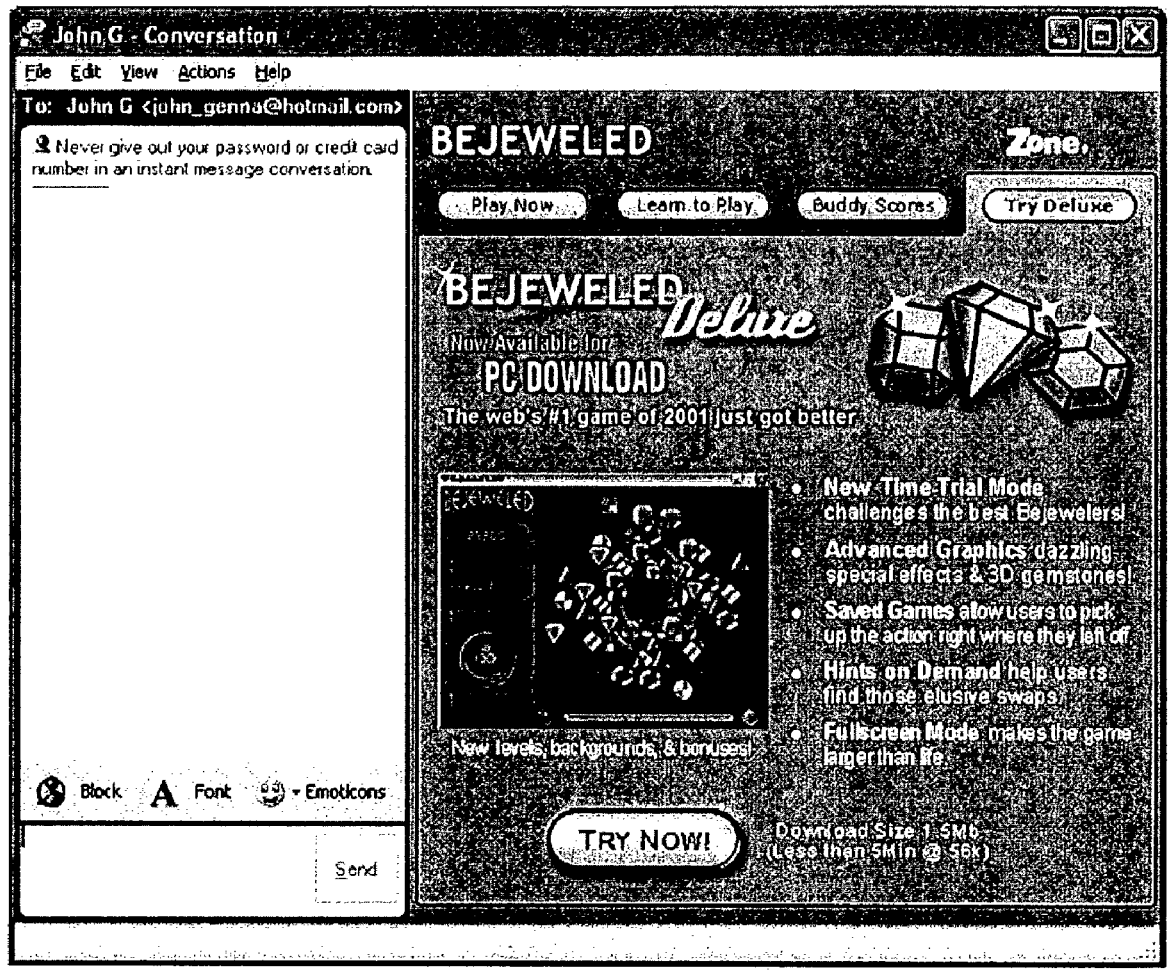
FIG. 11 illustrates an example user interface in which promotional material for a deluxe Bejeweled game is provided to users.

FIG. 10 illustrates a method of advertising and distributing a premium version of a game to users of an instant messaging system. First, in step 1002 users of the instant messaging system are provided access to a free version of the game in a user interface screen of the instant messaging system. FIG. 8 illustrates a free version of a Bejeweled game in a game region 816. In step 1004, promotional information describing the premium version of the game is provided in the user interface screen of the instant messaging system. FIG. 11 illustrates an example user interface 1100 in which promotional material for a deluxe Bejeweled game is provided to users. User interface 1100 and/or any of the previous user interfaces may also include advertisements for other games. User interface 1100 may also provide a custom game that may or may not be a premium version that will allow single player gaming inside the instant messaging framework.

In step 1006 it is determined whether a user has ordered a premium version of the game. When the user has ordered a premium version of the game, in step 1008 the premium version of the game is delivered. Step 1008 may include transmitting the game over a computer network or distributing a computer-readable medium containing the game. The premium version of the game may be a stand-alone application or configured to work with the instant messaging user interface. In one embodiment of the invention, games are sold as Windows® 32 game applications. In step 1010 the game may be linked to the user interface of the instant messaging system. For example, a link to the game may be added to a menu.

A variety of different payment schemes may be used to order premium games. For example, games may be purchased on a pay per game basis or pay per time period basis. In one embodiment, games are purchased using a skill-based gaming approach. Each user may pay a game fee and the winner or winners receive a portion, or all of the total game fee. For example, two users might each pay $1 to play a game and the winner might receive $1.50, with the remaining amount perhaps being collected for administration of the service. Users may also purchase, earn or otherwise obtain privileges to allow other users without game privileges to participate in a game. For example, a user may have a subscription to a premium game and the subscription may allow the user to play the game with another user who does not have a subscription.

In another embodiment of the invention, users may earn points or virtual currency based on game play performance or other activities, such as inviting a buddy to play a game. Digital objects, such as trophies, stars, icons, etc, may be earned with points or virtual currency. In yet another embodiment of the invention, an instant messaging user interface may be used to allow users to bid on digital objects during an online auction.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method of providing a game to at least two users of an instant messaging service while the at least two users are engaged in an instant messaging session, the method comprising:

in a user interface of an instant messaging system on a computing device, the user interface having a first region for exchanging instant messages and a second region for displaying available games, commencing an instant messaging session in the first region in which a first user exchanges instant messages with one or more other users, the one or more other users being members of the first user's buddy list;

displaying a list of games in the second region while the first user is communicating with the one or more other users in the first region;

upon the first user selecting one of the games, the selection being made while the first user is communicating with the one or more other users in the first region, transmitting a game module to the first and the one or more other users; and the first user commencing to play the selected game in the second region of the user interface with the one or more other users such that the first user plays the game with the one or more other users with whom the first user was exchanging instant messages at the time the first user selected the game, and wherein the first user and the one or more other users form a team in the selected game in which the team competes against additional users, wherein the first user exchanges instant messages with the one or more other users only in the first region of the user interface and wherein the user interface further includes a third region in which the first user exchanges instant messages only with the additional users against whom the team is competing.

2. The method of claim 1, wherein the game module comprises a complete game application.

3. The method of claim 1, wherein the game comprises a competitive game.

4. The method of claim 1, wherein the game comprises a collaborative game.

5. The method of claim 1, wherein the game comprises a competitive and collaborative game.

6. The method of claim 1, further including transmitting game statistics to the first user.

7. The method of claim 6, wherein the game statistics comprise an identification of which members of the first user's buddy list who have played at least one predetermined game.

8. The method of claim 7, wherein the game statistics further comprise an identification of which members of the first user's buddy list who have not played the at least one predetermined game.

9. The method of claim 6, wherein the game statistics comprise one or more user handicaps, tournament ladder data or event ladder data.

10. The method of claim 9, further including using the game statistics for sorting.

11. The method of claim 1, further including creating a game tournament between the first user and at least a portion of members of the first user's buddy list.

12. The method of claim 1, further including transmitting to at least the first user promotional data describing a premium version of the game.

13. The method of claim 12, further including transmitting the premium version of the game to the first user in response to a request from the first user.

14. The method of claim 1, wherein the game module is transferred from a server to the first user and the one or more other users.

15. The method of claim 1 wherein the list of games includes all available games and an indication of the games that the first user has rights to play.

16. The method of claim 15 wherein the indication of the games that the first user has rights to play comprises an icon.

17. The method of claim 1 wherein the one or more other users are members of the first user's buddy list.

18. The method of claim 17 wherein the first and the one or more other users comprise a team.

19. The method of claim 18 wherein the user interface has a third region and wherein the method further comprises:

permitting all members of the first user's buddy list to communicate in the first region of the user interface; and permitting only members of the team to communicate in the third region.

20. The method of claim 1 further comprising displaying a selectable link while the first user is communicating with the one or more other users in the first region, and in response to the first user selecting the link, displaying the list of games.

21. A computer-readable storage medium containing stored computer-executable instructions which when executed perform a method of providing a game to at least two users of an instant messaging service while the at least two users are engaged in an instant messaging session, the method comprising:

in a user interface of an instant messaging system on a computing device, the user interface having a first region for exchanging instant messages and a second region for displaying available games, commencing an instant messaging session in the first region in which a first user exchanges instant messages with one or more other users, the one or more other users being members of the first user's buddy list;

displaying a list of games in the second region during the instant messaging session between the first user and the one or more other users;

upon the first user selecting one of the games, the selection being made during the instant messaging session between the first user and the one or more other users, transmitting a game module to the first and the one or more other user; and the first user commencing to play the selected game in the second region of the user interface with the one or more other users such that the first user plays the game with the one or more other users with whom the first user was exchanging instant messages at the time the first user selected the game, and wherein the first user and the one or more other users form a team in the selected game in which the team competes against additional users, wherein the first user exchanges instant messages with the one or more other users only in the first region of the user interface and wherein the user interface further includes a third region in which the first user exchanges instant messages only with the additional users against whom the team is competing.

* * * * *